United States Patent [19]

Ignatowicz et al.

[11] Patent Number: 5,653,537
[45] Date of Patent: Aug. 5, 1997

[54] NON-CONTACTING INFRARED TEMPERATURE THERMOMETER DETECTOR APPARATUS

[75] Inventors: Steven A. Ignatowicz, Wheeling; Eugene F. Kalley, St. Charles; Daniel Scott Hampton, Mundelein; Sam Paris, Chicago, all of Ill.

[73] Assignee: Ircon, Inc., Niles, Ill.

[21] Appl. No.: 406,324

[22] Filed: Mar. 17, 1995

[51] Int. Cl.⁶ ............................................. G01J 5/08
[52] U.S. Cl. ................................... 374/131; 374/121
[58] Field of Search ........................ 374/121, 120, 374/123, 130, 131, 161; 356/43, 44, 73.1, 121

[56] References Cited

U.S. PATENT DOCUMENTS

| | | | |
|---|---|---|---|
| 2,633,543 | 3/1953 | Howatt | 310/9.8 |
| 2,756,353 | 7/1956 | Samsel | 310/8 |
| 2,831,115 | 4/1958 | Hahnel | 250/36 |
| 2,836,737 | 5/1958 | Crownover | 310/8.1 |
| 3,056,093 | 9/1962 | Oestreicher | 331/80 |
| 3,061,802 | 10/1962 | Westneat, Jr. | 332/26 |
| 3,179,902 | 4/1965 | Bernfeld et al. | 331/116 |
| 3,188,584 | 6/1965 | Awender et al. | 333/72 |
| 3,536,910 | 10/1970 | Ormrod et al. | 250/41.9 |
| 3,586,439 | 6/1971 | Treharne et al. | 356/43 |
| 3,616,638 | 11/1971 | Bennett et al. | 58/23 |
| 3,743,868 | 7/1973 | Kawada . | |
| 3,925,668 | 12/1975 | Anderson et al. | 250/351 |
| 3,926,524 | 12/1975 | Margulies et al. | 356/114 |
| 3,949,247 | 4/1976 | Fenner et al. | 310/8.6 |
| 3,999,433 | 12/1976 | Taplin | 73/339 |
| 4,198,123 | 4/1980 | Kremen | 350/157 |
| 4,208,741 | 6/1980 | Brun et al. | 455/180 |
| 4,227,158 | 10/1980 | Schroeder et al. | 331/2 |
| 4,233,512 | 11/1980 | Rupert | 250/338 |
| 4,262,198 | 4/1981 | Gupta et al. | 250/340 |
| 4,485,305 | 11/1984 | Kuwano et al. | 250/338 |
| 4,556,293 | 12/1985 | Burns et al. | 350/400 |
| 4,631,406 | 12/1986 | Nakata | 250/338 |
| 4,679,934 | 7/1987 | Ganguly et al. | 356/43 |
| 4,756,599 | 7/1988 | Maeda et al. | 374/131 |
| 4,783,599 | 11/1988 | Borden | 250/574 |
| 4,789,992 | 12/1988 | Wickersheim et al. | 374/131 |
| 4,790,324 | 12/1988 | O'Hara et al. | 128/664 |

(List continued on next page.)

FOREIGN PATENT DOCUMENTS

3123607 A1 4/1982 Germany .
3607679 A1 11/1986 Germany .

OTHER PUBLICATIONS

*Fiber Optic Sensors Fundamentals and Applications*, by D. A. Krohn, published by Instrument Society of America in 1988, pp. 138–141.

*Theory of Air Flow Generation by a Resonant Type $PVF_2$ Bimorph Cantilver Vibrator*, M. Toda, published by Gordon and Breach Science Publishers, Inc., 1979, U.K. vol. 22, pp. 911–918.

*Low Profile Piezoelectric Fans*, Piezo Systems, Inc. Product Catalog, pp. 14–15.

Radiation Thermometry for Low Temperatures Using an Infrared Hollow Waveguide, *Optical Engineering*, Aug. 1992, vol. 31 No. 8, pp. 1793–1798.

Faraday Rotation in a Multimode Optical Fiber in a Fast Rise-Time, High Magnetic Field, *American Institute of Physics*, Sep. 1986, pp. 2246–2249.

*Primary Examiner*—G. Bradley Bennett
*Attorney, Agent, or Firm*—Wallenstein & Wagner, Ltd.

[57] ABSTRACT

A light detector is disclosed for measuring the temperature of an object. The light detector includes a lens assembly for accepting light emitted from the object, an aperture, and a mirror for reflecting the infrared energy of the object into a fiber optic cable. The fiber optic cable is connected to a depolarizing element to which pressure is externally applied. The depolarization element relays the infrared energy into a detection portion and a signal processing portion for calculating temperature. Before the infrared light enters the fiber optic cable, a chopper, controlled by a driving circuit, chops the infrared energy reflected by the mirror.

56 Claims, 6 Drawing Sheets

U.S. PATENT DOCUMENTS

| | | | |
|---|---|---|---|
| 4,797,840 | 1/1989 | Fraden | 364/557 |
| 4,804,273 | 2/1989 | Tondello et al. | 356/427 |
| 4,806,761 | 2/1989 | Carson et al. | 250/332 |
| 4,815,841 | 3/1989 | Bickler et al. | 356/43 |
| 4,850,697 | 7/1989 | Schoennauer et al. | 356/419 |
| 4,862,030 | 8/1989 | Yokoyama et al. | 310/332 |
| 4,874,251 | 10/1989 | Thomas et al. | 374/45 |
| 4,918,305 | 4/1990 | Wlodarczyk et al. | 250/227.14 |
| 4,919,505 | 4/1990 | Bartosiak et al. | 350/96.18 |
| 4,922,309 | 5/1990 | Sekiwa et al. | 356/300 |
| 4,968,112 | 11/1990 | Lovely et al. | 350/96.15 |
| 5,011,296 | 4/1991 | Bartosiak et al. | 374/131 |
| 5,060,890 | 10/1991 | Utterback et al. | 246/169 |
| 5,096,301 | 3/1992 | Stanley | 356/73.1 |
| 5,099,120 | 3/1992 | Turnbull | 250/338.2 |
| 5,113,458 | 5/1992 | Taylor | 385/11 |
| 5,115,211 | 5/1992 | Hara | 331/116 |
| 5,180,363 | 1/1993 | Idemoto et al. | 202/32 |
| 5,181,019 | 1/1993 | Gottlieb et al. | 340/474 |
| 5,185,675 | 2/1993 | Banks | 359/181 |
| 5,202,745 | 4/1993 | Sorin et al. | 356/73.1 |
| 5,210,735 | 5/1993 | Hoshino et al. | 369/54 |
| 5,220,833 | 6/1993 | Nakamura | 73/505 |
| 5,221,146 | 6/1993 | Maruyama | 384/447 |
| 5,225,793 | 7/1993 | Higashiyama et al. | 331/158 |
| 5,233,258 | 8/1993 | Myoga et al. | 310/323 |
| 5,235,235 | 8/1993 | Martin et al. | 310/313 |
| 5,247,222 | 9/1993 | Engle | 310/328 |
| 5,260,772 | 11/1993 | Pollak et al. | 356/417 |
| 5,265,267 | 11/1993 | Martin et al. | 455/326 |
| 5,274,345 | 12/1993 | Gau | 333/153 |
| 5,281,887 | 1/1994 | Engle | 310/335 |
| 5,281,899 | 1/1994 | Culp | 318/116 |
| 5,293,039 | 3/1994 | Mongiols | 250/227.16 |
| 5,302,921 | 4/1994 | Shigemori et al. | 331/67 |
| 5,303,032 | 4/1994 | Uesu et al. | 356/345 |
| 5,315,203 | 5/1994 | Bicos | 310/326 |
| 5,317,380 | 5/1994 | Allemand | 356/338 |
| 5,327,104 | 7/1994 | Kikushima | 331/68 |
| 5,345,519 | 9/1994 | Lu | 385/12 |
| 5,381,493 | 1/1995 | Egalon et al. | 385/13 |
| 5,391,001 | 2/1995 | Rupert et al. | 374/130 |

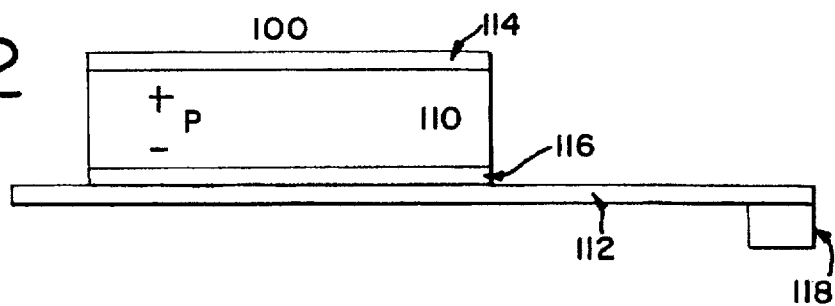
FIG. 2
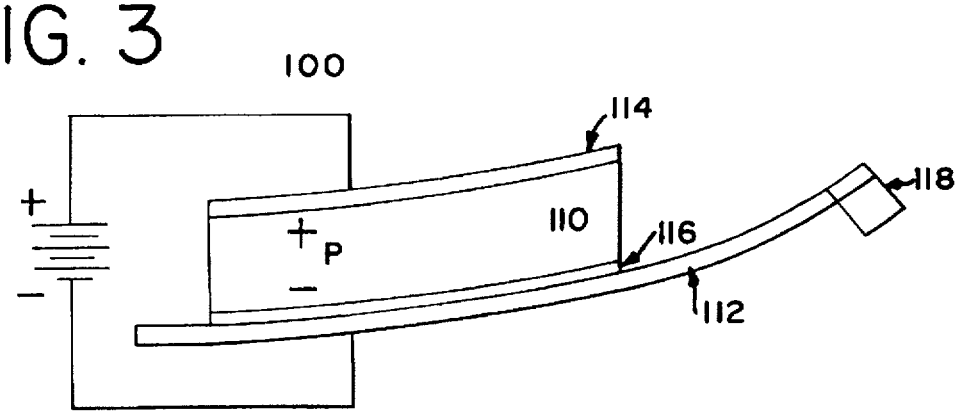
FIG. 3
FIG. 4
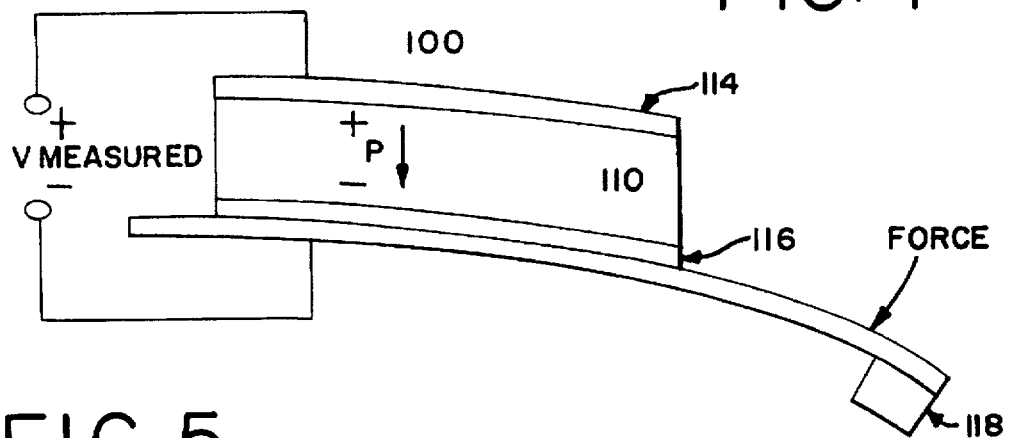
FIG. 5
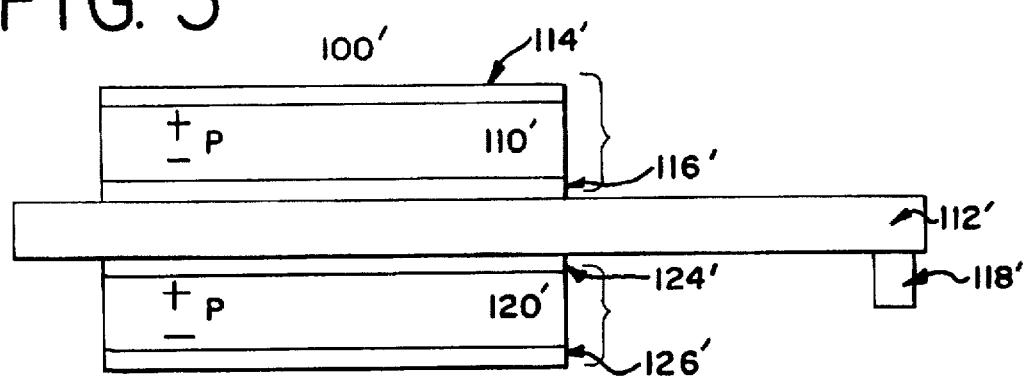

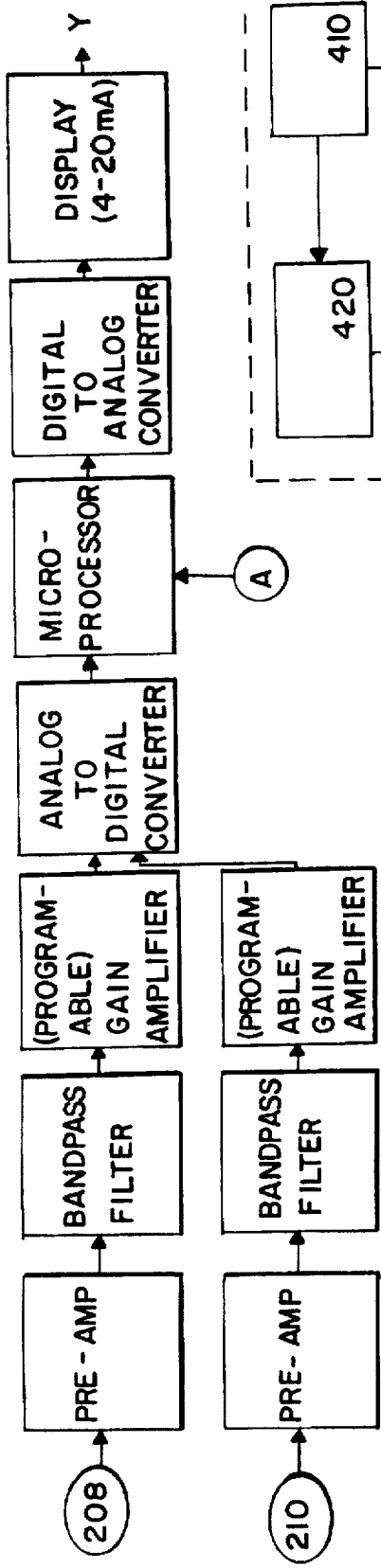
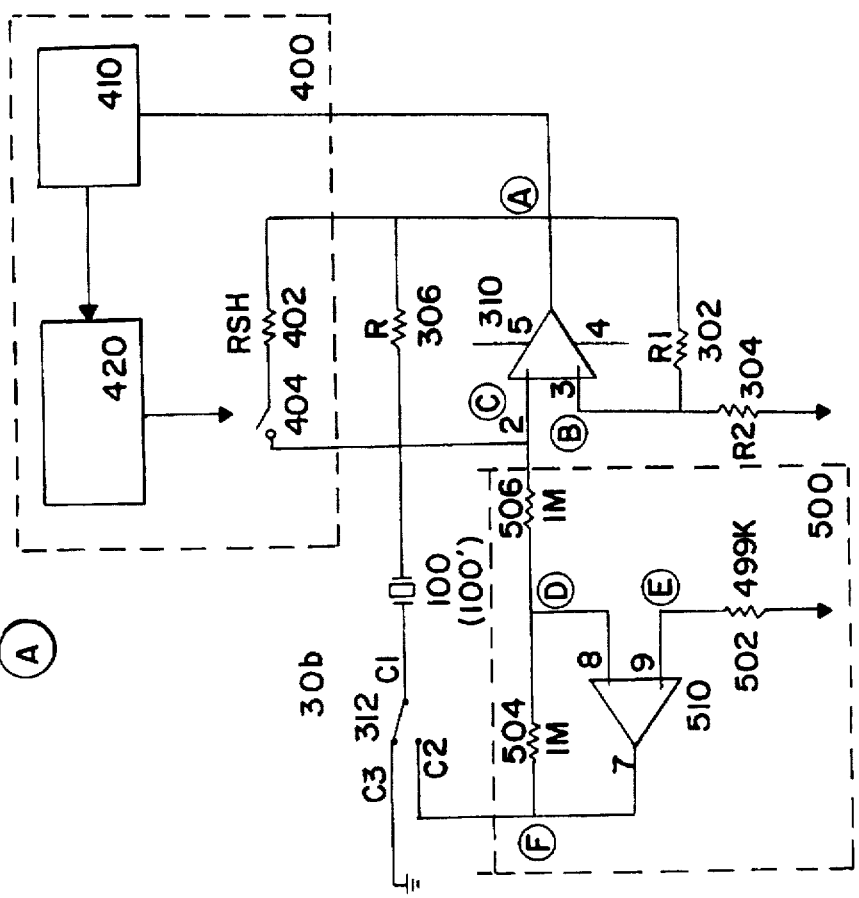
FIG. 7
FIG. 6

NON-CONTACTING INFRARED TEMPERATURE THERMOMETER DETECTOR APPARATUS

DESCRIPTION

1. Technical Field

The present invention generally relates to a non-contacting infrared temperature thermometer, sometimes referred to as an infrared pyrometer, for determining the temperature of an object without coming into contact with the object. Specifically, this invention relates to a depolarization method and apparatus for improved depolarization of light when the light passes through the depolarization apparatus, and to this depolarization method and apparatus as used within a pyrometer, although not limited thereto. The invention also relates to chopping techniques as used within a pyrometer.

2. Background Prior Art

Non-contacting optical temperature detection techniques measure the light radiated by objects to determine the temperature of the objects. Generally, this temperature measuring technique has advantages over contacting temperature measuring techniques because it is fast and eliminates the need to make good contact with the objects, especially moving objects.

Light radiated from objects, such as bare metals, can be polarized and the degree of polarization can vary with the viewing angle with respect to the surface of the objects.

Non-contacting optical temperature detectors can have optical components such as dichroic mirrors that provide different outputs depending on the degree of polarization of the light. These different outputs will cause errors in the temperature measurement.

Other optical measurement techniques are also affected by the degree of polarization of the light. For example, spectrometers that utilize optical components, such as gratings, can generate errors that are sensitive to the degree of polarization of the light.

Previous attempts to solve the above problems utilize a depolarizer before the light is measured. Two types of depolarizers are Lyot and Cornu, but these are too expensive for most measurement techniques. Another depolarizer utilizes a fiber optic bundle several meters long. This type of depolarizer can have significant cost and create a packaging problem. An even further depolarizer is a diffuser, but a diffuser will cause significant loss in signal.

The specifics of one previous infrared thermometer includes several main features. When light is radiated from an object, the radiated light holds enough information to make a determination of the temperature of the object. A lens system captures the infrared light radiated from and visible light reflected off of the object. The captured light can be in both the visible and non-visible portions of the spectral array. The lens system was adjustable to be focused on the object to be measured.

The infrared thermometer collected the visible and infrared light from the target object. Both the visible and infrared light went through the lens and encountered a special mirror. This mirror had special coatings which reflect the infrared light down to the detector and allowed the visible light to pass on through the mirror to a user's eye. The visible light is focused at a point in the sensing head where a piece of glass is located. On this glass there was a small black circle, called a reticle. A sensing head eyepiece was focused on this reticle, so that when a user looked through the eyepiece and focused the lens on the object, the reticle appeared to be on the object. When the lens was in focus on the object, the infrared detectors were receiving infrared light from everything appearing inside of the reticle.

The infrared light from the object was reflected off the mirror down toward the detectors. As the infrared light travelled toward the detectors, it passed through a fiber optic cable.

As the infrared light struck the detectors, a reaction occurred that resulted in electrical outputs from the detectors. The signals were then amplified and linearized. These signals were then used to calculate temperature according to common two-channel or two-color pyrometer techniques.

In order to capture the changes in temperature, the characteristics of the signals created by the light needed to be constantly monitored. The prior art included continuously and repeatedly chopping the light before it entered the detector. In the past, a flat rotating blade with evenly placed cutouts was used to chop the infrared light. This flat blade is similar to a conventional fan, but much smaller. The flat blade was placed directly over the end of the detector package. This flat blade was called a chopper. Another device has also been used to continuously and repeatedly chop the infrared light before it gets to the detector. This device included a piezoelectric reed (blade) which deflected under an applied frequency in a specific modulation circuit as described in U.S. Pat. No. 4,233,512 (Rupert).

As these types of blades oscillated, they chopped the incoming light. In previous pyrometers, the chopping was synchronized with the calculation of temperature using the electrical signals created by the detectors. After the electrical signals were created from the detectors and processed, a temperature signal was created. Some designs also required linearization of the signal to display the temperature.

In addition to the above mentioned problems with the prior art, the prior art is also more costly and larger in size as compared to the present invention. The present invention is provided to solve the above and other problems of the prior art.

SUMMARY OF THE INVENTION

The present invention measures the temperature of an object. The non-contacting infrared thermometer includes a focusable lens assembly for receiving and focusing the light radiated from the object. The light then passes through an aperture and strikes a dichroric mirror. Visible light passes through the mirror to the eyepiece which is used to aim and focus the optical temperature detector. Infrared light reflects off of the mirror, passes through a piezoelectric chopper that chops the infrared light. The infrared light then enters a fiber optic cable in order to relay the infrared light into the infrared detector portion that re-focuses the light and then beamsplits the infrared light into two broad wavelength bands. One wavelength band is narrowed by an optical filter and is detected by an infrared detector. The other wavelength band is directly detected by an infrared detector whose upper wavelength cutoff limits the wavelength band.

The detector portion then outputs the signals to circuitry for amplification, bandpass filtering, A/D sampling and processing by a microprocessor. The microprocessor then outputs a temperature signal to a D/A converter and 4/20 milliampere output circuit.

The beamsplitter in the infrared detector portion has transmitted and reflected outputs that vary significantly with the degree of polarization of the infrared light. A pressure applicator is provided to significantly increase the depolarization effect of the fiber optic cable, thereby significantly decreasing the beamsplitter output changes with respect to polarized light. The pressure applicator applies substantial pressure to the fiber optic cable and introduces substantial mechanical stress within fibers thereby causing substantial stress induced birefringence. This birefringency introduces multiple phase shifts between the polarization components of the infrared light causing a result where the resultant polarization components are essentially equal and the infrared light is depolarized. This depolarization apparatus is low cost and easy to package without increasing the size of the temperature detector.

The present invention also uses an improved chopper circuit, which is less expensive and is a more simplified apparatus than previous designs, for controlling the oscillations of the piezoelectric optical chopper. Other features and advantages of the invention will be apparent from the following specification taken in conjunction with the following drawings.

BRIEF DESCRIPTION OF DRAWINGS

FIG. 2 is a side view of a single piezoceramic element of the piezoelectric optical chopper of the present invention without external biasing;

FIG. 3 is a side view of a single piezoceramic element of the piezoelectric optical chopper of the present invention with external biasing;

FIG. 4 is a side view of a single piezoceramic element of the piezoelectric optical chopper of the present invention deflected in the opposite direction than in FIG. 3;

FIG. 5 is a side view of a dual-piezoceramic element of the piezoelectric optical chopper of the present invention without external biasing;

FIG. 6 is a circuit for controlling the oscillations and deflections of the piezoelectrical optical chopper of the present invention, including optional circuit features;

FIG. 7 is a detailed block diagram of the processing portion of the present invention as shown in the functional block, in dashed lines, from FIG. 1;

DETAILED DESCRIPTION

Figure 1:
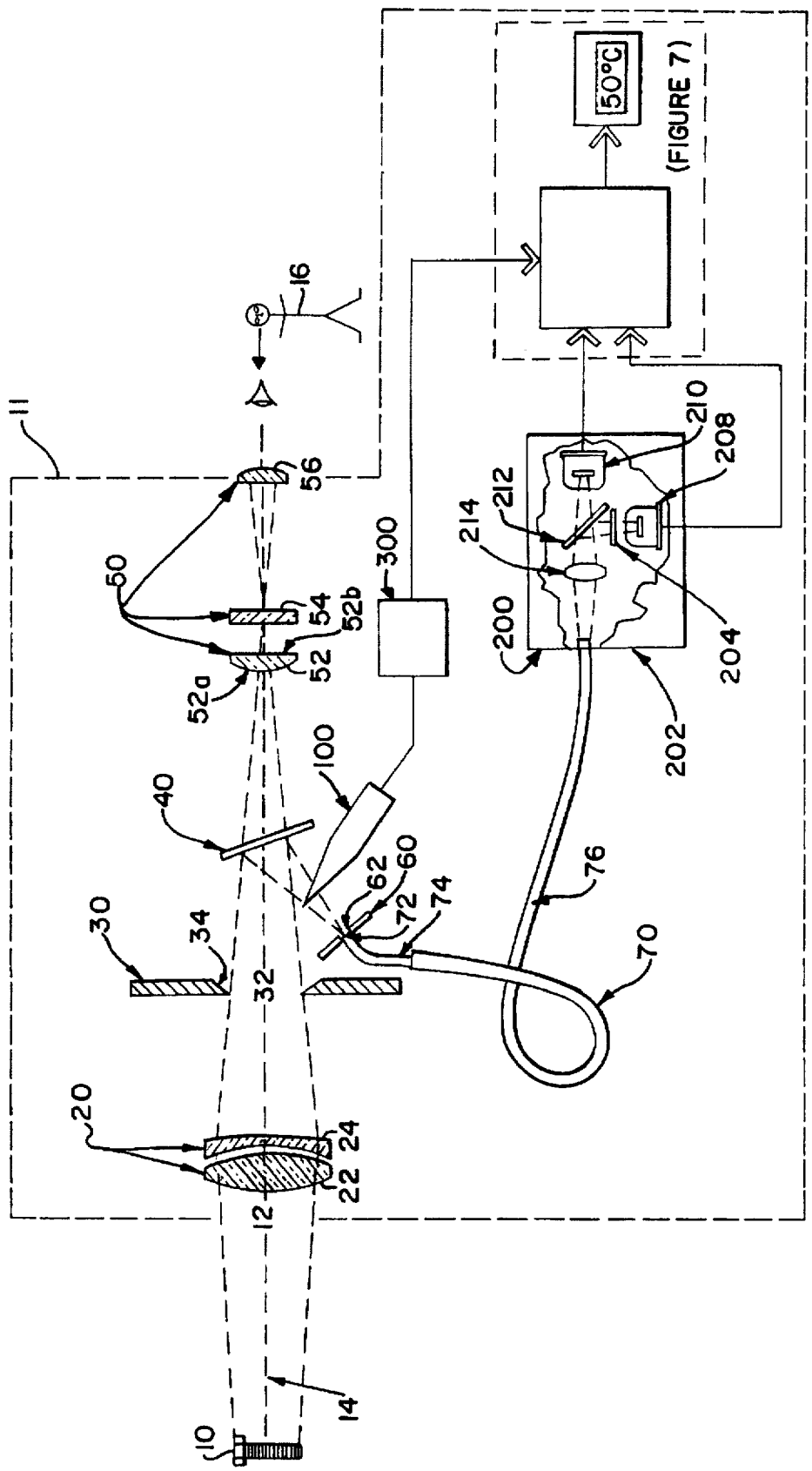
FIG. 1 is a pictorial layout of the main functional parts of the temperature detector of the present invention showing a functional block, in dotted lines, that is shown in more detail in FIG. 7.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

FIG. 1 depicts the basic detector apparatus for determining the temperature of an object 10. The apparatus consists of a housing 11, an achromatic lens assembly 20, an objective aperture 30, a folding mirror 40, a piezoelectric optical chopper 100, a circuit 300, a field stop 60, and a depolarizing apparatus 70 for conveying the light to a detection portion 200. The housing should be made of materials that are appropriate for the environment in which the temperature detector apparatus will be used, as is well known. In addition, the materials used in the housing should protect all the internal components within the housing from excessive temperatures and conditions.

The achromatic lens assembly 20 is coupled to the housing and captures the light radiated from the object 10. The light can be in both the visible and non-visible portions of the electro-magnetic spectrum. The achromatic lens assembly 20 is made of two lenses. A first achromatic lens 22 accepts the light from the object 10 and refracts or transfers the light onto a second achromatic lens 24. The first achromatic lens 22 has two convex sides. The second achromatic lens 24 has one concave side and one convex side, the concave side facing toward the opening 12 of the housing and toward the convex side of the first achromatic lens 22 that faces away from the opening of the housing 12. Both the first and second achromatic lenses 22, 24 focus the light of the object toward the objective aperture 30. The objective aperture 30 is placed in-line with a central axis 14 that passes through the center of the achromatic lens assembly 20 and through the center of the object 10. The objective aperture 30 is made from an opaque material that would otherwise not allow the light of the object 10 to pass through it. However, a circular bore 32 exists at the center of the objective aperture 30 and allows a portion of the overall light of the object 10 to pass through the objective aperture 30. The bore 32 has an angled edge 34 so that light passing through the bore 32 is not inappropriately or inadvertently cut off. The center of the bore 32 is aligned with the center axis 14.

Also in-line with the central axis 14 is a conventional folding mirror 40. The folding mirror 40 has special coatings that reflect the infrared portion of the light of the object 10 that passes through the bore 32 of the objective aperture 30. The visible light does not get reflected by the folding mirror 40 and passes through the folding mirror 40 toward a viewing assembly 50. The viewing assembly 50 is made up of a field lens 52, a reticle 54, and an eye lens 56. The field lens 52 has a convex side 52a and a flat side 52b. The convex side 52a faces the folding mirror 40 and the center of the field lens is also in-line with the central axis 14. The reticle 54 is a piece of glass that has two flat sides and has a small black circle, or reticle, etched at its center, the center being in-line with the central axis 14. An eye lens 56 is also a part of the viewing assembly 50. The viewing assembly allows the user 16 to focus in on the object 10, as will be explained in more detail below.

The folding mirror 40 reflects only the infrared light of the object 10. A fiber optic cable 76, which includes a clad rod 79, is disposed between the folding mirror 40 and a detector portion 200. Thus, before the light reaches the fiber optic cable 76, these elements receive the light emitted from the object 10. Continuing, a front end opening 72 is placed at one end of the fiber optic cable 76. The front end opening 72 is located on a rigid ferrule portion 74 of the fiber optic cable 76. The rigid ferrule portion 74 and the front end portion 72 are mounted in-line with the reflected portion of the infrared light of the object 10 coming from the folding mirror 40. The opposite end of the fiber optic cable 76 is coupled to an infrared detector portion 200. The fiber optic cable 76 is used for conveying the received infrared light of the object 10 to the detector portion 200. Thus, the cable 76, and other elements, together define a depolarizing apparatus 70, conveys the infrared light of the object 10 from the field stop 60 to the detector portion 200. Referring also to FIGS. 9 through 13, the depolarizing apparatus 70 is also for depolarizing the infrared light, and the pressure applicator 80 therein for applying pressure to the depolarizing element to enhance the depolarization of the received light. The depolarizing element can include an optical waveguide 78 which can be made of multimode optical fibers. The depolarizing apparatus multiply-reflects the light within the depolarizing element as the light varies in intensity (i.e.—as the temperature of the object changes). The pressure applicator 80 applies pressure to the depolarizing element to increase birefringence in order to introduce multiple phase shifts between the polarization components of the infrared light within the depolarizing element as the infrared light travels through the depolarizing element. The pressure applicator 80 includes a first applicator 82 for supporting the optical waveguide or fiber optic cable 78 therein. The pressure applicator 80 also includes a second applicator 84 for applying pressure to the fiber optic cable 78. Within the embodiment in FIGS. 12 and 13, the force is applied from two screw holes 86, 88, and screws torqued therein, to connect the first applicator 82 to the second applicator 84 with the fiber optic cable or optical wave guide 78 inserted between the two. Through this application of force, the applicator 80 reduces the degree of polarization (DOP) as will be explained further below, and increases the amount of depolarization occurring within the depolarization apparatus.

Before the infrared light from the object 10 reaches the front end opening 72 of the fiber optic cable 76, a field stop 60 blocks out any extra exterior infrared light in a similar manner as the objective aperture 30. The field stop 60 is mounted on the front end opening 72 of the fiber optic cable 76. The field stop 60 has a bore 62 through its center, which is in-line with the infrared light of the object 10 that is reflected by the folding mirror 40. The field stop 62 is made of an opaque material so as to block the exterior infrared light.

Returning to the viewing assembly 50, on the reticle 54 there is a small black circle etched at the center. This circle is called a "reticle," and its diameter is slightly larger than the diameter of the front end opening (eyepiece) 72 of the fiber optic cable 76. In order to get the light focused correctly into the front end opening 72, a user 16 looks through an eye lens 56. The eye lens 56 is a lens with one convex side and one flat side. The flat side faces the reticle 54 and is in-line with the central axis 14. In order to get the object 10 correctly focused within the front end opening 72, the user 16 should try and focus the black circle (the "reticle") of the reticle 54 exactly on top of the object 10. When the viewing assembly 50 is in focus on the object, the front end opening 72 is receiving infrared light from everything appearing inside of this "reticle."

Before the infrared light enters the field stop 60 or the fiber optic cable 76, a chopper 100, 100' is used to continuously intermittently cut off the infrared light being detected by the detector portion 200. Once the chopped infrared light enters the detector portion 200 by means of the fiber optic cable 76, the infrared light is detected by a first detector 208 and a second detector 210 within the detector portion 200 and a very small electrical signal is created by these detectors 208, 210. Before the light reaches the detectors 208, 210, the light passes through a beam splitter lens 214 and a beamsplitter 212. One beam then passes through the optical filter 204 and reaches one detector 208. The other beam reaches the other detector 210. A thermal block 202 is provided to house the detector portion 200. The thermal block 202 is preferably made of a material which will prevent thermal gradients upon the instruments within the detector portion 200, and is heated to a temperature of about 60° C. The output from the detectors 208, 210 is an AC signal, and is at an extremely low level. Outputs of picoamps are common. Since the signal has to be amplified and linearized before a temperature can be presented, the temperature detector changes this low level AC signal to high level AC signal. After amplification, the AC signal is band-pass filtered and sampled at a rate synchronous with the chopping. Thus, capturing characteristics of the signals created by the infrared light allows for calculation of the temperature.

Turning to FIG. 7, the electrical signals created by the detectors 208, 210 pass through a preamplifier, a band-pass filter, a programmable gain amplifier, and then through an analog to digital converter. The digital signal of the chopped infrared light is then inputted into a microprocessor. The chopper 100, 100' and chopper circuit 300 are also linked to the microprocessor for the purpose of synchronizing the measurement of the infrared light and calculation of temperature with the chopping performed by the chopper 100, 100'. Based on the measurement of the infrared light, the microprocessor calculates the temperature of the object 10 through known light radiation principles.

In order to capture the changes in temperature of the object, the characteristics of the signals created by the infrared light need to be constantly monitored. The chopping of the infrared light by the chopper 100, 100' takes place in synchronization with the calculation of temperature by the microprocessor and provides for temperature updating that occurs quite rapidly.

To reduce noise and provide smooth transitions, several chop cycles are weight averaged together. A chop cycle begins with the infrared energy appearing or being detected by the detectors 208, 210 after the detectors 208, 210 detect no infrared signal (the end of a "chop") (see FIG. 8, point J). A signal then begins to appear to the microprocessor and continues increasing to the full amount of infrared energy, as measured by the detectors 208, 210 (this may not always occur). The chopper 100, 100' will then move to full deflection in one direction and then move back in the opposite direction until the chopper again cuts off the infrared energy that the detectors 208, 210 are detecting (the beginning of a "chop"). The chopper will move through its neutral position and will again allow infrared energy to be detected at the end of a chop cycle (see FIG. 8, point I). A "bad" chop cycle can occur if something is blocking the object 10 or is otherwise cutting off the optical image and energy of the object 10 to be measured. Because chopping occurs at such a fast rate, there is no humanly noticeable delay, based on the averaging of the chop cycles, between the actual changes in temperature of the object 10 and the temperature that appears on the display after calculation.

The chopper 100, 100' continuously and repeatedly chops the infrared energy before the field stop 60 in order to create a new graphical curve for each chop cycle that is performed. As the chopper 100, 100' oscillates, it chops the incoming energy. (The output from the detectors 208, 210 is now an AC signal. This AC signal can now be amplified and then synchronously demodulated back to a DC signal. The frequency of the chopper is sent to the microprocessor from the chopper circuit 300 (FIGS. 6 & 7) and the microprocessor automatically knows when to make the appropriate calculations on, or sample, the signal that the micro-processor is receiving from the analog to digital converter.

After the signal is processed by the microprocessor, the resultant digital output signal, that is representative of the temperature of the object 10, can then be transformed to a 4–20 mA signal or left in digital form, depending on the type of display unit being used to display the temperature.

Turning now to the structure of the chopper 100, 100', FIGS. 2–5 show two different types of piezoelectric optical choppers which can be used. Focusing on the single element piezoelectric optical chopper 100, the chopper 100 is made up of piezoceramic element 110, a bending element 112, a first electrode 114, a second electrode 116, and a flag or chopping element 118. As an alternative embodiment, the dual element chopper 100' (FIG. 5) includes a first piezoceramic element 110', a second piezoceramic element 120', a bending element 112', a first upper electrode 114', a second upper electrode 116', a first lower electrode 124', a second lower electrode 126', and a flag, or chopping element (118'). These types of piezoelectric oscillating devices are well known in the piezoelectric art.

As described above, the chopper chops the infrared energy of the object 10. The chopping is performed through the oscillation of the chopping element 118 and the bending element 112. The oscillation of the chopper 100, 100' takes place through piezoelectric principles. Turning to FIG. 2, the piezoceramic element 110 is polarized by the vendor by putting a large DC voltage across the electrodes 114, 116. After polarization, the chopper 100 will bend if a voltage is applied across the electrodes 114, 116 (see FIG. 3). The chopper 100 will bend the opposite direction (deflect in the opposite direction) if the voltage across the electrodes 114, 116 is reversed.

Turning to FIG. 4, after the piezoceramic element 110 is polarized, if the chopper is bent (physically deflected) in either direction, the chopper 100 will create a voltage that can be measured between the two electrodes 114, 116. If the chopper is bent in the opposite direction, the reverse voltage will be created between the electrodes 114, 116. Thus, after polarization of the chopper 100, the chopper 100 inherently contains a capacitance with a stored charge and can generate a voltage upon physical deflection. The dual piezoceramic element optical chopper in FIG. 5 has similar properties and works in a similar manner based on the piezoelectric characteristics described above.

A piezoelectric optical chopper circuit 300 is also provided to control the chopping of the chopper 100, 100'. FIG. 6 shows the drive circuitry for the chopper 100, 100'. The circuit 300 can optionally include an auto-level portion 400 and/or a voltage doubler portion 500. These options will be described in more detail below. The circuit 100 includes the piezoelectric optical chopper 100 or 100' (connections would change for the chopper 100'), resistors R 306, R1 302, and R2 304, and an operational amplifier 310. The connections are shown in FIG. 6. The autolevel portion 400 includes a frequency detector 410, an analog switch or relay 420, a resistor Rsh 402 in parallel with R 306, and a switch 404. The voltage doubler portion 500 includes two 1 Megaohm resistors 504, 506, a 499 Kilo-ohm resistor 502, and an operational amplifier 510. An additional switch 312 is placed between points C1, C2, and C3 for allowing a user to select the voltage doubler option/portion 500.

In operation, the circuit 300 works as follows. Assume the chopper electrode 114 is grounded as shown, and every point in the circuit is at ground potential. Upon power-up, if the output A were to go slightly positive, the voltage level at B would be greater than the level at C, forcing the voltage at the output A to go to the positive rail.

Upon this sudden voltage spike, the piezoceramic element 110, acting as a capacitor, begins to charge from zero potential up towards the positive rail at a rate determined by the piezo capacitance and the resistor R. The voltage divider formed by R1 and R2 sets a threshold level at B, which is slightly below the output level. When the piezoelectric voltage C exceeds the threshold level, the polarity of the amplifier inputs 2, 3 reverses, forcing the voltage at the output A to the negative rail. The sequence just described then continues in the opposite direction. The output A of the amplifier 310 is a square-wave oscillator.

The piezoceramic element 110 is similar to a motor, and the initial voltage spike causes the bending element 112 to move or deflect in one direction. Because the chopper 100 is a mechanical oscillator having a large "Q" at its fundamental resonance frequency, the bending element 112 immediately undergoes displacement and begins to vibrate at resonance frequency.

The piezoelectric chopper 100 is also similar to a generator. The mechanical stress on the piezoceramic element 112 due to motion of the blade induces a "reaction" voltage, lesser in magnitude and of opposite polarity than the drive voltage (the voltage applied to the electrodes 14, 116 of the chopper 100.

Figure 8:
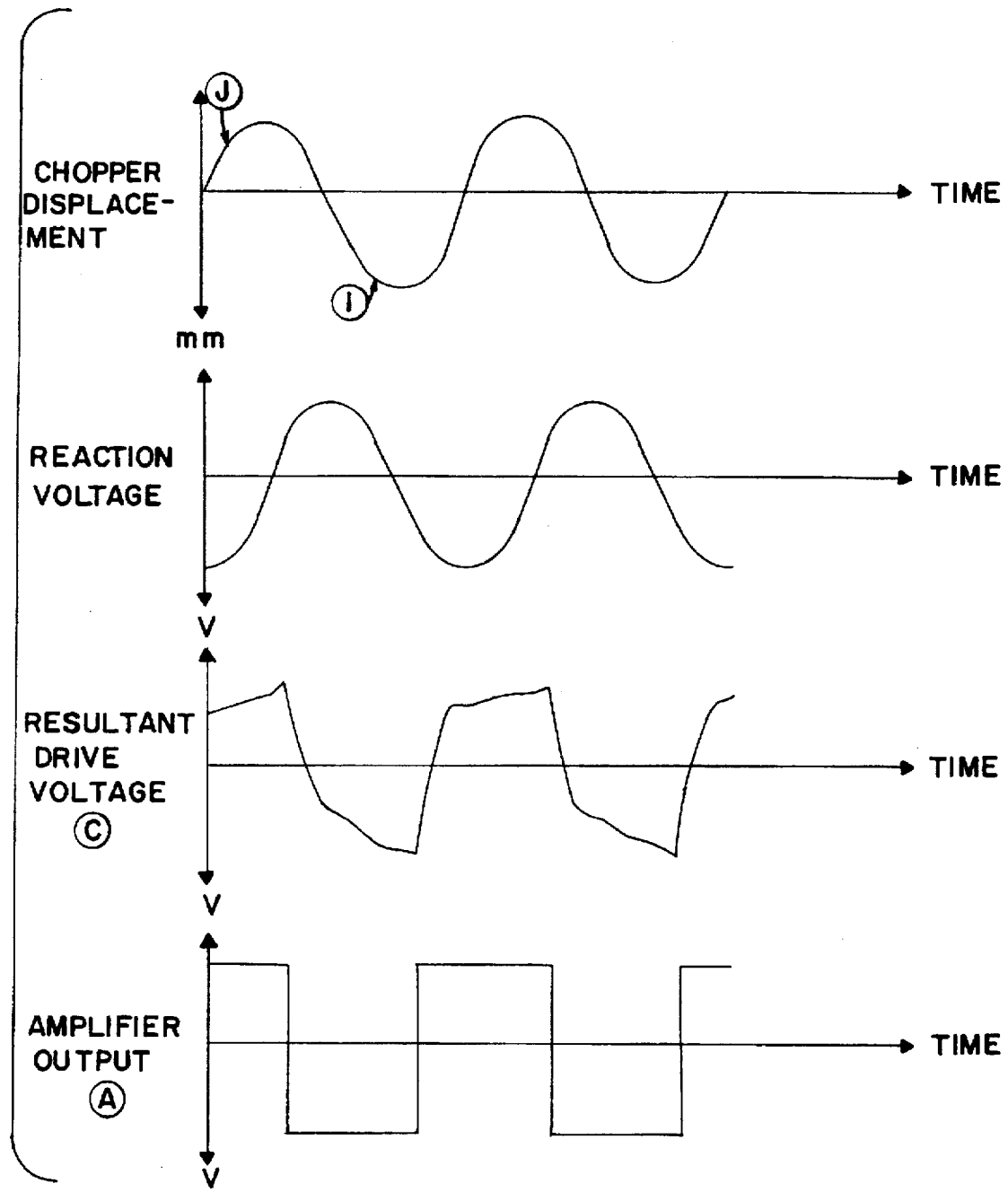
FIG. 8 is a graphical depiction of the chopper displacement in distance, chopper reaction voltage, circuit resultant drive voltage, and amplifier output voltage, all depicted over time.

FIG. 8 illustrates the time sequence of events under steady-state conditions. At resonance, the reaction voltage is exactly out of phase with the velocity of the chopper blade. Because the reaction subtracts from the drive signal during the steep portions of the drive voltage, the total piezo voltage is delayed from reaching threshold until the reaction reaches zero and starts to generate a voltage which adds to the drive voltage. At the point where threshold is reached (just after the bending element 112 has reached maximum deflection), the chopper 100 voltage (across the electrodes 114, 116) quickly changes direction, pushing the blade in the opposite direction and the system can then be considered "locked" into resonance.

There are additional start-up and component choices that should be considered. If R2>>R1, then the voltage at C may never reach threshold. (In practice, there is finite resistance from C to ground, such that C cannot quite be as large as A). Under this condition, the output A can "stick" to a rail upon power-up unless the chopper 100 can generate enough reaction voltage to exceed threshold in a very short time. Thus, it is desirable to choose R1 and R2 such that square-wave oscillation is guaranteed so that the chopper is given many "pushes" and can build up displacement from start-up.

For similar reasons, it is necessary to choose a value for R large enough to give the chopper 100 a chance to delay the voltage reversal across the chopper 100 until the bending element 112 is at a point in its vibration/oscillation cycle where a reversal reinforces the oscillations.

Unfortunately, both of these measures, which ensure chopper 100 oscillation after start-up, can reduce the peak drive voltage across the chopper 100, and consequently reduce the magnitude of bending element 112 displacement/deflection. When increasing the power supply voltage is not possible, a significant increase in displacement/deflection can be realized with the voltage doubler portion 500 as configured of FIG. 6.

Another enhancement, shown conceptually in FIG. 6, is to select an R 306 value that guarantees chopper 100 oscillation at the expense of large displacement/deflection. When the circuit 300 has been oscillating for a number of cycles at the resonance frequency, the frequency detector 410 triggers a switch 404 by means of the relay 420 that adds a shunt resistor Rsh 402 across the large R 306, effectively reducing R 306 and allowing greater displacement/deflection. If, for any reason, the chopper 100 stops, the frequency detector 410 will sense this and open the switch 404, increasing the effective R 306, and placing the circuit 300 back into lock.

Figure 9:
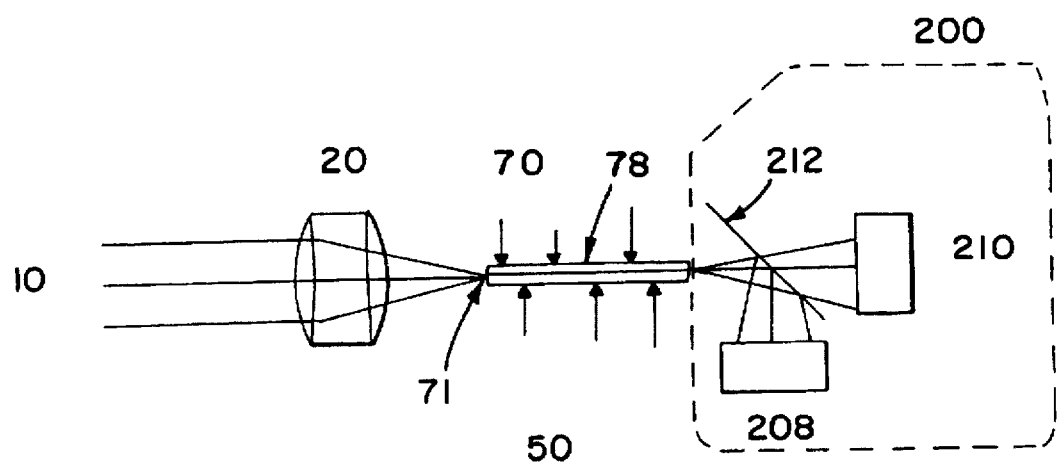
FIG. 9 is a partial view of some of the main elements of the present invention depicting the depolarization and detection of the infrared light.
Figure 10:
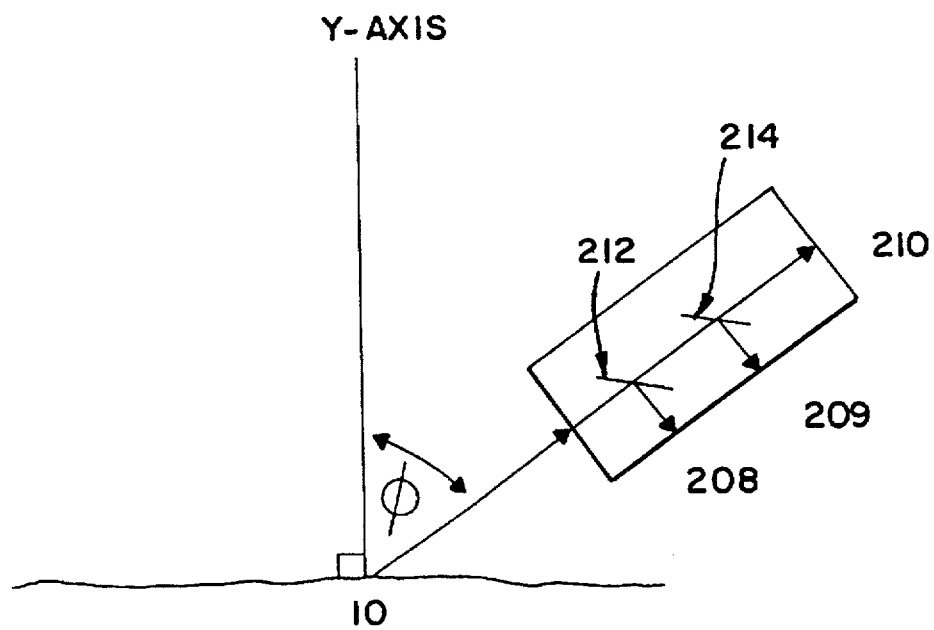
FIG. 10 is a object-light viewing-angle view of present invention depicting an alternative embodiment of the detection portion.
Figure 11:
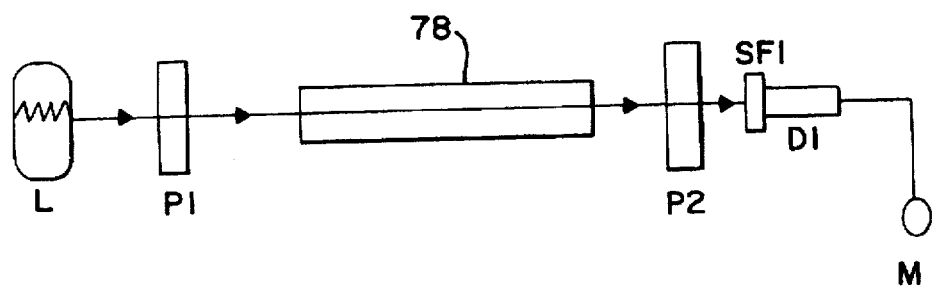
FIG. 11 is a view of a degree of polarization testing apparatus for testing the specific forces required to achieve a particular degree of polarization.

Returning to the detector portion 200 shown in FIGS. 1, 9, and 10, the infrared detector portion 200 includes a beamsplitter 212 for splitting the infrared light into two wave-length bands. The two detectors 208, 210 are provided for detecting the respective wavelength bands of the infrared light.

For a better understanding of the present invention some general optical energy concepts will be described below. Basic polarization and depolarization techniques are based on the following concepts: The direction of oscillation of a light wave is perpendicular to the propagation direction, and these two directions define a plane, called the plane of polarization of the wave. It is customary to describe the various polarization states of light as a vector sum of two orthogonal linear states. The resulting state is determined by the relative amplitudes and phases of the two orthogonal components. Within this model, natural, or unpolarized, light consists of components of equal amplitudes in all possible planes of polarization, whose phase interrelationships vary randomly and much more rapidly than can be detected by modern instrumentation.

An optical element that preferentially transmits or reflects light of certain polarization states is called an analyzer. One such analyzer is a linear polarizer, which can be used to both create polarized light and to detect it. The output of an ideal linear polarizer will vary the most in the case of the linear state, transmitting 100% of the input light when its transmission axis is exactly parallel to the plane of polarization of the input light, and completely extinguishing the light when its transmission axis is rotated to be exactly perpendicular to that plane.

Generally, all material through which light can pass have characteristics which "analyze" the light (radiation or optical energy). The polarizing characteristics of a material depend on its molecular structure, surface conditions, and the wavelength of the incident radiation. In addition, the state of polarization as measured by an optical instrument, such as a pyrometer, spectrometer, or radiometer (instruments that measure light energy) is dependent upon the angle from which it views its target (see FIG. 10).

Within FIG. 9, the optical instrument within the box (pyrometer, spectrometer, radiometer, or other optical device) comprises a receiving lens 20, an optical waveguide or fiber optic bundle 78, a beam splitter 212, and two infrared detectors 208, 210 (one for each channel). External stresses are applied to the waveguide 78, as was explained above, and which will be explained further below.

FIG. 10 illustrates the optical instrument "looking" at a surface of the object 10 from a somewhat glancing angle (as opposed to directly overhead from the perpendicular y-axis). The target surface 10 will be emitting its own radiation as a consequence of its temperature. From a great many target materials, the instrument will receive more light in certain linear polarization states than in others due to the reflection angle and other factors.

This polarization sensitivity can present a serious problem to radiometers, spectrometers, and pyrometers as was generally explained above, and in particular to multi-channel/detector radiometers that employ some method of splitting a single input light beam into two or more different wavelength beams to be analyzed, such as in FIGS. 1, 9, and 10. If the optical element used as the beamsplitter 212, or additional beamsplitters 214, act as an "analyzer," then the amounts of energy delivered to the multiple channels (the detectors 208, 209, and 210—optical paths) may depend on the polarization state of the input light into the radiometer, spectrometer, or pyrometer. A multi-color pyrometer, for instance, splits a radiated beam into two or more spectral bands, and uses the relative signal levels to determine the apparent temperature of the object 10. A polarization-analyzing beamsplitter 212 will cause the pyrometer to change its indicated object (target) 10 temperature as the target 10 is viewed from various angles, or as the target 10 itself changes in some fashion other than temperature. Dielectric plate beamsplitters, dichroic mirrors, diffractive elements, and dispersive elements are some examples of polarization-analyzing beamsplitters 212.

For a better understanding of the invention, further concepts will be discussed below. There are several sources within optical elements (beamsplitter 212) that can alter the polarization state of light. Polarization changes due to reflection occur when light encounters an, interface between materials that have different refractive indices (a refractive index is a parameter quantifying the speed of light within materials), and are dependent on the angle between the propagation direction of the light and interface surface orientation, as discussed above. One source which alters the polarization state is birefringence. Birefringence occurs when the different polarization states travel at different speeds through the material, generally taking different paths. Another source which alters the polarization state is when light is scattered from molecules.

Now turning to other specific inventive features, when light energy is being collected, it is advantageous to collect the light without having to consider its initial polarization state. In order to do this, it is necessary to implement an optical device, known as a depolarizer, to transform the polarized light beam into one having all polarization directions. Once this is achieved, it no longer matters that there are polarization-analyzing optical elements further along in the path, which affect the optical energy based on the polarization state, because the depolarizer has destroyed the polarization information to which the elements are sensitive. One way to perform this depolarization is through external stress birefringence using an optical wave guide 78. Some possible waveguides 78 include multimode optical fibers, clad rods, and image guides.

Materials used in the optical waveguide 78 that are normally insensitive to the polarization state of light traveling through it can be made birefringent by introducing mechanical stress. If such a material is subject to tension or compression, it can introduce phase shifts between polarization components of light. This is a result of photoelasticity, or stress birefringence. The stress can be externally applied by squeezing, twisting, pulling, etc., or can be permanently introduced in the manufacturing process.

Figure 12:
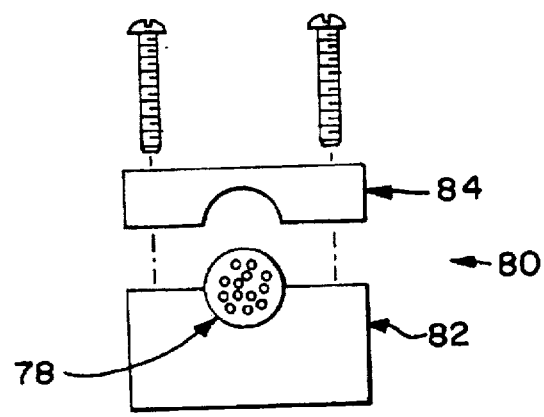
FIG. 12 is a cut-away side-view of the depolarizing apparatus of the present invention depicting enhancement of depolarization through applied force.
Figure 13:
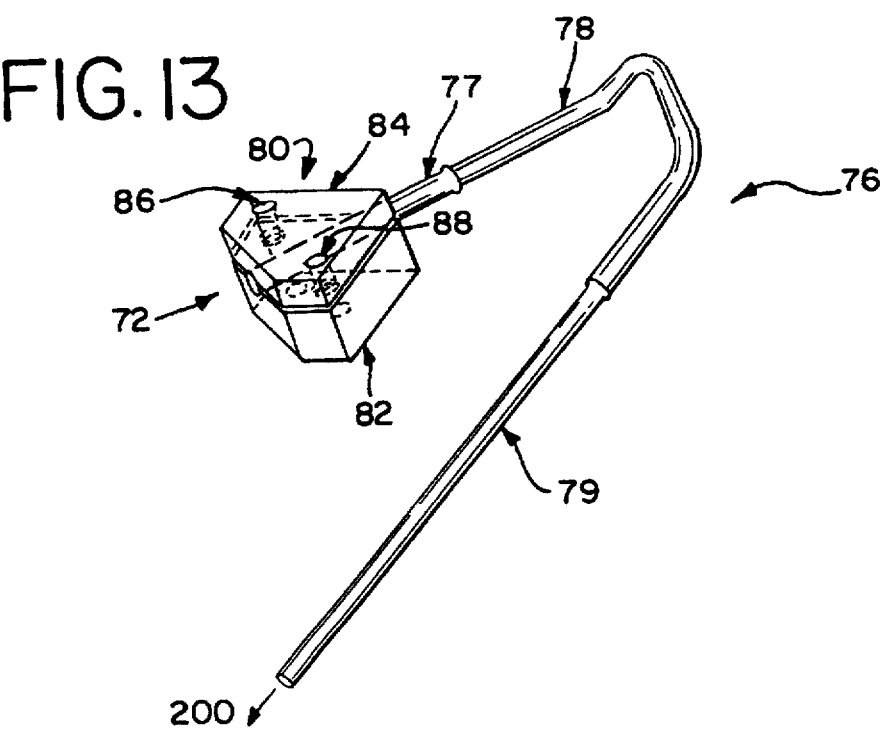
FIG. 13 is a perspective view of a part of the depolarizing apparatus of the present invention depicting one embodiment of the pressure applicator.

Multimode fibers used in optical waveguides tend to cause depolarization of the light. When external stress is applied to these fibers, much more depolarization occurs. Test results in the near-infrared with multimode fiber bundles and image guide optical waveguides demonstrate that the application of a substantial compressive force to the walls of a waveguide improves its depolarizing behavior significantly, without significant signal loss of optical energy as will be explained further below with test results. FIGS. 9, 12, and 13 illustrate the stressed waveguide or fiber bundle 78.

Referring specifically to FIG. 13, the fiber bundle 78 is glued directly to a clad rod 79. The other end of the bundle is sheathed and glued in a steel ferrule 77, which contains the fiber ends of the fiber bundle 78. This is the end where the pressure applicator 80 applies pressure. The pressure applicator 80 can be a clamp that serves as the mounting structure for the bundle 78 or as a part of the receiving portion that receives the light. The screws on this clamp 80 are tightened in screw holes 86, 88 to exert stress on the fibers inside the ferrule 77 to the extent that polarized light entering this end 72 exits depolarized out of the clad rod 79 end toward the detection portion 200. The general stress or squeezing technique can be applied anywhere along this assembly. The best result is obtained by applying stress at the ferrule 77, and the next best result is obtained by applying stress at the clad rod 79. Squeezing the fiberoptic jacket can cause too much loss of light.

The manner in which the depolarizing apparatus was tested and measured to achieve useable enhancements of depolarization is illustrated below. A polarized light source was focused onto the fiber bundle 78 (the source comprised unpolarized light passing through a linear polarizer P1 whose transmission axis is vertical). When a linear polarizer P2 was placed next in the path with a detector D1 behind the polarizer, the detector response varied as the polarizer was rotated (maximum when P2 transmission axis is vertical, minimum when P2 axis is horizontal). The fiber optic bundle 78 is inserted between the two polarizers. If the fiber optic bundle 78 did not substantially randomize the polarization, the light emerging from the bundle 78 was still polarized in the vertical direction, and a large variation in detector response occurred as P2 was rotated. If the fiber optic bundle 78 completely randomized the polarized input light, light exits with polarizations in all directions, and no change in detector response would occur as P2 rotates. A spectral filter (SF1) is placed on the detector to investigate the behavior at specific wavelengths. Numbers were then assigned to this behavior as quantity called the "degree of polarization" (DOP). This described the contrast between the maximum and minimum response of the detector as the analyzing polarizer P2 rotated.

DOP=(max response−min response)/(max response+min response).

Light which is completely polarized will have a minimum response of zero, and thus a DOP of one. Light which is completely depolarized yields the same value for maximum and minimum responses, and thus has a DOP of zero. Light with a DOP of less than 0.05 is generally considered to be depolarized to an acceptable level for many applications, using light at a wavelength of 1.55 um (infrared).

The present depolarization technique applies to the use of many beamsplitting techniques that are polarization sensitive, and can be implemented into single or multi-channel radiometers/pyrometers without degradation of performance as the polarization character of the incoming light varies. This depolarization technique may be useful in other instruments and applications as well.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An apparatus for measuring light, comprising:
   a detector portion;
   means for receiving light, and for conveying the received light to the detector portion, wherein the conveying means includes a means for depolarizing the light, and means for applying pressure to the depolarizing means to enhance the depolarization of the received light.

2. The apparatus as claimed in claim 1 wherein the depolarization means includes an optical waveguide.

3. The apparatus as claimed in claim 2 wherein the optical waveguide is a multimode optical fiber bundle.

4. The apparatus as claimed in claim 2 wherein the optical waveguide is a clad rod.

5. The apparatus as claimed in claim 2 wherein the optical waveguide is an image guide.

6. The apparatus as claimed in claim 1, 2, 3, 4 or 5 wherein the detector portion includes a beamsplitter for splitting the light into wavelength bands, and detectors for detecting the respective wavelength band of light.

7. The apparatus as claimed in claim 1, wherein the receiving means includes a lens assembly for accepting light, and a mirror substantially aligned with the lens assembly for reflecting the light.

8. The apparatus as claimed in claim 7 wherein the depolarization means includes an optical waveguide.

9. The apparatus as claimed in claim 8 wherein the optical waveguide is a multimode optical fiber bundle.

10. The apparatus as claimed in claim 8 wherein the optical waveguide is a clad rod.

11. The apparatus as claimed in claim 8 wherein the optical waveguide is an image guide.

12. The apparatus as claimed in claim 1, 2, 3, 4 or 5 wherein the apparatus is for measuring temperature.

13. The apparatus as claimed in claim 7 wherein the detector portion includes a beamsplitter for splitting the light into wavelength bands, and detectors for detecting the respective wavelength band of light.

14. The apparatus as claimed in claim 8 wherein the detector portion includes a beamsplitter for splitting the light into wavelength bands, and detectors for detecting the respective wavelength band of light.

15. The apparatus as claimed in claim 9 wherein the detector portion includes a beamspliter for splitting the light into wavelength bands, and detectors for detecting the respective wavelength band of light.

16. The apparatus as claimed in claim 10 wherein the detector portion includes a beamsplitter for splitting the light into wavelength bands, and detectors for detecting the respective wavelength band of light.

17. The apparatus as claimed in claim 11 wherein the detector portion includes a beamsplitter for splitting the light into wavelength bands, and detectors for detecting the respective wavelength band of light.

18. The apparatus as claimed in claim 7 wherein the conveying means accepts varying intensity light after the light is reflected by the mirror, wherein the depolarizing means multiply-reflects the light within the depolarizing means, wherein the applying means applies pressure to the depolarizing means to introduce phase shifts between the polarization components of the light within the depolarizing means as the light travels through the depolarizing means to increase the amount of depolarization occurring within the depolarization means.

19. The apparatus as claimed in claim 8 wherein the conveying means accepts varying intensity light after the light is reflected by the mirror, wherein the depolarizing means multiply-reflects the light within the depolarizing means, wherein the applying means applies pressure to the depolarizing means to introduce phase shifts between the polarization components of the light within the depolarizing means as the light travels through the depolarizing means to increase the amount of depolarization occurring within the depolarization means.

20. The apparatus as claimed in claim 9 wherein the conveying means accepts varying intensity light after the light is reflected by the mirror, wherein the depolarizing means multiply-reflects the light within the depolarizing means, wherein the applying means applies pressure to the depolarizing means to introduce phase shifts between the polarization components of the light within the depolarizing means as the light travels through the depolarizing means to increase the amount of depolarization occurring within the depolarization means.

21. The apparatus as claimed in claim 10 wherein the conveying means accepts varying intensity light after the light is reflected by the mirror, wherein the depolarizing means multiply-reflects the light within the depolarizing means, wherein the applying means applies pressure to the depolarizing means to introduce phase shifts between the polarization components of the light within the depolarizing means as the light travels through the depolarizing means to increase the amount of depolarization occurring within the depolarization means.

22. The apparatus as claimed in claim 11 wherein the conveying means accepts varying intensity light after the light is reflected by the mirror, wherein the depolarizing means multiply-reflects the light within the depolarizing means, wherein the applying means applies pressure to the depolarizing means to introduce phase shifts between the polarization components of the light within the depolarizing means as the light travels through the depolarizing means to increase the amount of depolarization occurring within the depolarization means.

23. The apparatus as claimed in claim 7 further comprising a chopper for chopping the light reflected by the mirror.

24. The apparatus as claimed in claim 8 further comprising a chopper for chopping the light reflected by the mirror.

25. The apparatus as claimed in claim 9 further comprising a chopper for chopping the light reflected by the mirror.

26. The apparatus as claimed in claim 10 further comprising a chopper for chopping the light reflected by the mirror.

27. The apparatus as claimed in claim 11 further comprising a chopper for chopping the light reflected by the mirror.

28. The apparatus as claimed in claim 7 wherein the apparatus is for measuring temperature.

29. The apparatus as claimed in claim 8 wherein the apparatus is for measuring temperature.

30. The apparatus as claimed in claim 9 wherein the apparatus is for measuring temperature.

31. The apparatus as claimed in claim 10 wherein the apparatus is for measuring temperature.

32. The apparatus as claimed in claim 11 wherein the apparatus is for measuring temperature.

33. The apparatus as claimed in claim 6 wherein the receiving means includes a lens assembly for accepting light, and a mirror substantially aligned with the lens assembly for reflecting the light.

34. The apparatus as claimed in claim 6 wherein the apparatus is for measuring temperature.

35. A non-contacting light detector for measuring temperature, comprising:

a lens assembly for accepting light;

a mirror substantially aligned with the lens assembly, and positioned for reflecting a varying intensity infrared portion of the light, the mirror allowing visible light to pass through the mirror in substantially the same direction in which the light entered the mirror;

means for conveying the light reflected by the mirror after the conveying means accepts the light reflected by the mirror, the conveying means being adapted to convey the light to a detector portion, wherein the conveying means includes a means for depolarizing the light, the depolarizing means multiply-reflecting the optical energy within the depolarizing means, wherein the conveying means further includes a means for applying pressure to the depolarizing means to introduce phase shifts between the polarization components of the optical energy within the depolarizing means as the optical energy travels through the depolarizing means to increase the amount of depolarization occurring within the depolarization means.

36. The non-contacting light detector as claimed in claim 35 further comprising a chopper for chopping the light reflected by the mirror for measuring temperature.

37. The non-contacting light detector as claimed in claim 35 an aperture substantially aligned with the lens assembly, aperture being substantially aligned with the mirror.

38. The non-contacting light detector as claimed in claim 35 wherein the depolarizing means includes an optical waveguide with optical fibers running therethrough.

39. The non-contacting light detector as claimed in claim 38 wherein the optical waveguide is a clad rod.

40. The non-contacting light detector as claimed in claim 35 further comprising a detector portion for accepting the chopped infrared light from the conveying means and for transforming the chopped infrared light into an electrical signal which is representative of the energy level of the chopped infrared light entering the detector portion through the conveying means.

41. The non-contacting light detector as claimed in claim 40 wherein the detector portion includes a beamsplitter for splitting the light into wavelength bands, and infrared detectors for detecting the respective wavelength band.

42. The non-contacting light detector as claimed in claim 41 wherein the beamsplitter is chosen from a group including a di-electric plate beamsplitter, a dichroic mirror, diffractive elements, and dispersive elements.

43. The non-contacting light detector as claimed in claim 40 further comprising a means for converting the electrical signal exiting the detection portion into a display signal for displaying a standardized temperature which is representative of the temperature of the light radiating from the object.

44. The non-contacting light detector as claimed in claim 35 further comprising a means for displaying a temperature from a signal which is obtained from the light of the object.

45. The non-contacting light detector as claimed in claim 38 wherein the detector portion is provided for creating electrical signals that are representative of the light energy in the different wavelength bands, the non-contacting light detector further comprising:

a preamplifier for converting the signal created by a detector portion into a usable signal;

a bandpass filter for filtering out the portions of the useable signal which are unnecessary for temperature calculation;

a gain amplifier for amplifying the signal exiting the bandpass filter;

an analog to digital converter for converting the signal exiting the gain amplifier into a digital signal, a microprocessor, adapted to receive the digital signal, for calculating temperature of an object base on the digital signal.

46. A non-contacting light detector for measuring the temperature of an object comprising:

a housing;

a lens assembly coupled to the housing for accepting light given off by the object in the direction of the lens assembly, the light having an infrared portion;

an aperture substantially aligned with the lens assembly;

a mirror substantially aligned with the lens assembly and the aperture, and positioned for reflecting the infrared portion of the total light passing through the aperture, the mirror allowing visible light to pass through the mirror in substantially the same direction in which the light entered the mirror;

means for conveying the infrared light reflected by the mirror after the conveying means accepts the infrared light reflected by the mirror, the conveying means adapted to convey the infrared light to a detection portion, wherein the conveying means includes a means for depolarizing the infrared light, the depolarizing means multiply-reflecting the varying intensity infrared light within the depolarizing means, wherein the conveying means further includes a means for applying pressure to the depolarizing means to introduce phase shifts between the polarization components of the optical energy within the depolarizing means as the optical energy travels through the depolarizing means to increase the amount of depolarization occurring within the depolarization means;

a chopper for continuously chopping the infrared light reflected by the mirror before the infrared light enters the conveying means;

a detector portion for accepting the chopped infrared light from the conveying means and for transforming the chopped infrared light into an electrical signal which is representative of the energy level of the chopped infrared light entering the detector portion through the conveying means;

means for converting the electrical signal exiting the detector portion into a display signal for displaying a standardized temperature which is representative of the display signal and the temperature of the object; and, means for displaying a standard temperature from a signal which is obtained from the light radiated from the object.

47. A depolarization apparatus for depolarizing light passing through the depolarization apparatus comprising:

a depolarizing element extending between a first end and a second end of the depolarization apparatus, the light entering the depolarizing element at the first end, the light being multiply-reflected within the depolarizing element, and the light exiting the second end of the depolarization element;

means for applying pressure to the depolarizing element to introduce phase shifts between the polarization components of the light within the depolarizing element as the light travels through the depolarizing element to increase the amount of depolarization occurring within the depolarization element.

48. The depolarization apparatus as claimed in claim 47 where the light intensity is varying.

49. The depolarization apparatus as claimed in claim 47 wherein the depolarizing element includes an optical waveguide with optical fibers running therethrough.

50. The depolarization apparatus as claimed in claim 49 wherein the optical waveguide is a clad rod.

51. The depolarization apparatus as claimed in claim 49 wherein the optical waveguide is an image guide.

52. The depolarization apparatus as claimed in claim 49 wherein the fibers are multimode fibers.

53. The depolarization apparatus as clammed in claim 47 or 48 wherein the amount of pressure applied by the pressure applying means on the depolarizing element is at least an amount which will cause the degree of polarization to be less than 0.05. D.O.P.

54. A non-contacting temperature detector for measuring the temperature of an object comprising:

a lens assembly for accepting light;

a mirror substantially aligned with the lens assembly, and positioned for reflecting the infrared portion of the light, the mirror allowing visible portion of the light to pass through the mirror;

means for conveying the infrared energy reflected by the mirror after the conveying means accepts the infrared energy reflected by the mirror, the conveying means adapted to convey the infrared energy to a detection portion;

a piezoelectric optical chopper for continuously synchronously chopping the infrared energy reflected by the mirror before the infrared signal enters the conveying means, the piezoelectric chopper comprising:

at least one piezoceramic element;

at least two electrodes, each piezoceramic element disposed between two of the electrodes;

a bending element in bending association with at least one electrode; and, a chopping element in bending association with the bending element, the chopping element of the piezoelectric chopper oscillating into and out of the path of the infrared energy travelling between the mirror and the conveying means in order to continuously chop the infrared energy; and, a circuit for controlling the piezoelectric optical chopper comprising:

means connected to at least one electrode, for driving a current into the chopper, the current causing the chopping element of the chopper to initially move in one direction;

means connected to at least one electrode, for sensing when the chopping element has begun to move in the direction opposite to the direction of initial movement;

first means connected to at least one electrode, for responding to the chopping element moving in the direction opposite to the direction of initial movement, by driving a current into the chopper in a direction opposite to the direction which the driving means drives the initial current; and, second means connected to at least one electrode and associated with the driving means, for responding to the oscillator beginning to move in the direction of initial movement after moving in a direction opposite to the direction of initial movement, by driving a current into the oscillator in a direction which is the same as the direction which the driving means drives the initial current.

55. The non-contacting optical energy detector for measuring the thermal characteristics of an object as claimed in claim 54 further comprising a means for increasing the current being driven into the chopper in order to increase the deflections of the chopping element.

56. The non-contacting optical energy detector as claimed in claim 54 further comprising a means for increasing the voltage drop across the chopper in order to increase the deflections of the chopping element.

* * * * *

UNITED STATES PATENT AND TRADEMARK OFFICE
CERTIFICATE OF CORRECTION

PATENT NO. : 5,653,537
DATED : August 5, 1997
INVENTOR(S) : Ignatowicz et al.

It is certified that error appears in the above-identified patent and that said Letters Patent is hereby corrected as shown below:

In Col. 14, Line 64, delete the number "38" and replace it with the number -- 35 --.

Signed and Sealed this

Ninth Day of December, 1997

Attest:

BRUCE LEHMAN

Attesting Officer  Commissioner of Patents and Trademarks